June 25, 1929.  R. N. CONWELL  1,718,454
ELECTRICAL SYSTEM
Original Filed May 11, 1921  2 Sheets-Sheet 1

Rollin N. Conwell,
Inventor,
Delos G. Haynes,
Attorney

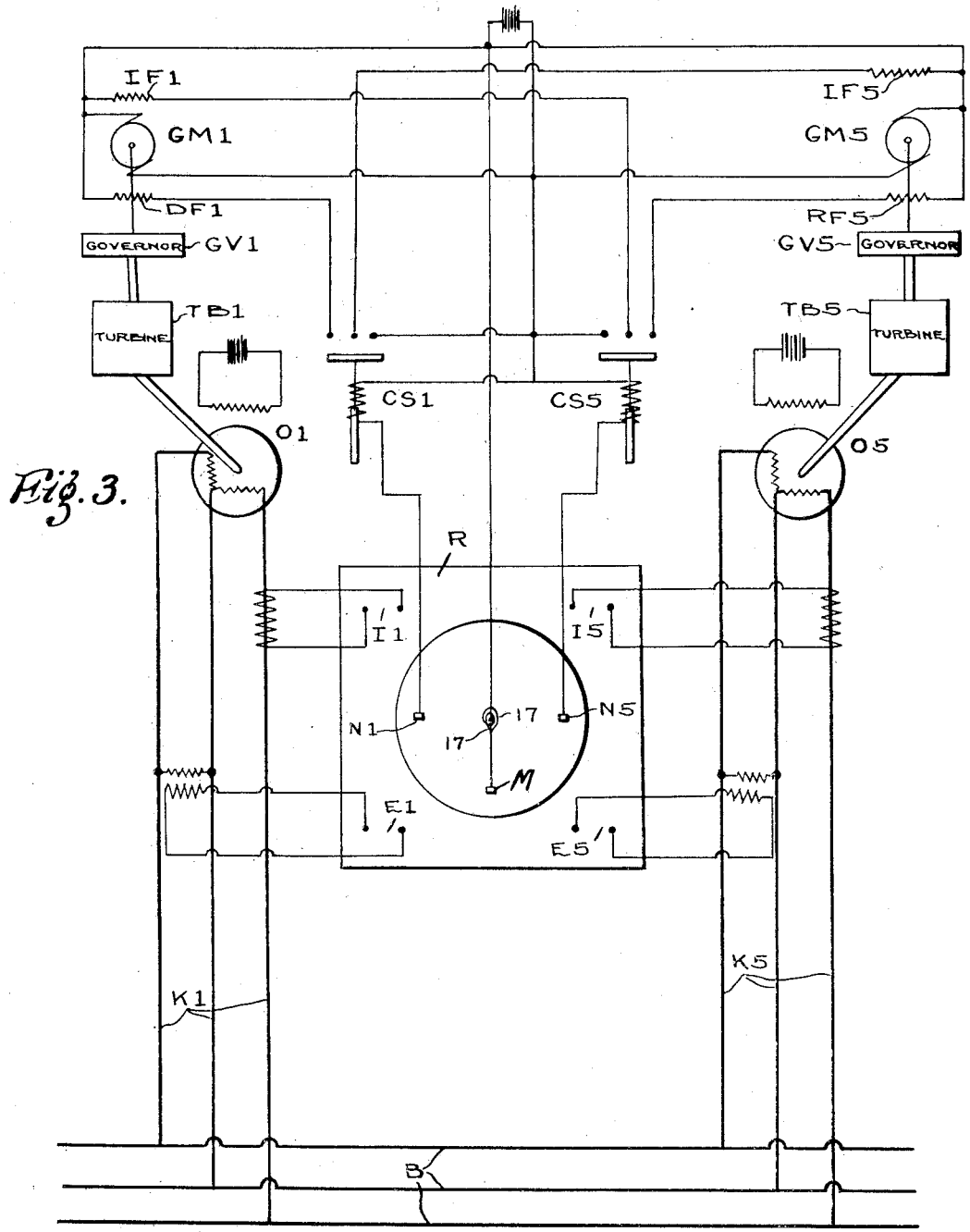

Patented June 25, 1929.

1,718,454

UNITED STATES PATENT OFFICE.

ROLLIN N. CONWELL, OF BLOOMFIELD, NEW JERSEY.

ELECTRICAL SYSTEM.

Original application filed May 11, 1921, Serial No. 468,586. Divided and this application filed July 28, 1923. Serial No. 654,396.

This invention relates to electrical methods and apparatus, and with regard to certain more specific features, to methods and apparatus for use in connection with alternating currents.

This application is a division of my application filed May 11, 1921, Serial No. 468,586, patented September 9, 1924, Patent No. 1,508,361.

Among the several objects of the invention may be noted the provision of inexpensive and durable electrical, differential, reactive load, switch gear apparatus and auxiliaries therefor, utilizing inductive action; and the provision of simple and reliable apparatus of the class described. Other objects will be in part obvious and in part pointed out hereinafter.

The invention accordingly comprises the features of construction, steps and sequence of steps, combinations of elements and arrangements of parts, which are exemplified in the description hereinafter in connection with the accompanying drawings, and the scope of the application of which will be indicated in the following claims.

In the accompanying drawings, in which is illustrated diagrammatically one of various possible embodiments of the invention, Fig. 1 is an elevation of one form of apparatus;

Fig. 3 is a circuit diagram of a differential reactive switch-gear arrangement utilizing the construction shown in Fig. 1.

Similar reference characters indicate corresponding parts throughout the several views of the drawings.

Fig. 1.

Figure 1:
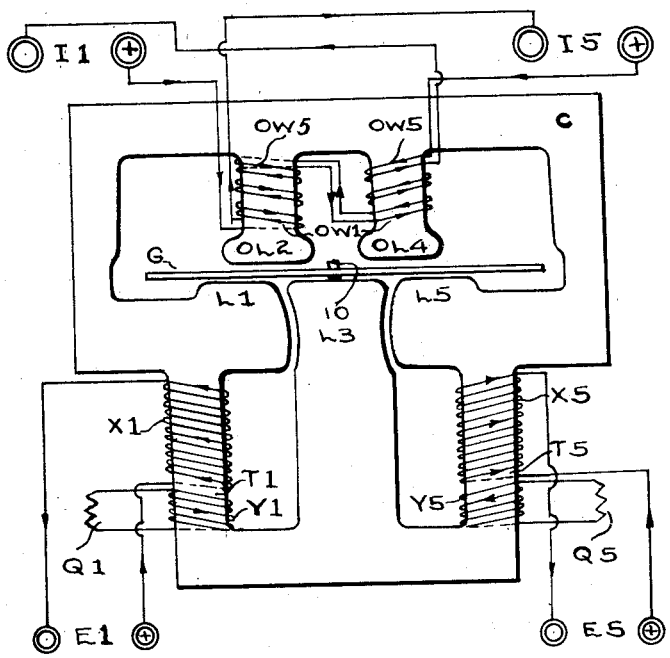

*Construction.*—Referring now more particularly to Fig. 1, there are illustrated at $E^1$, $E^5$, two sources of alternating current, in this instance obtained from the potentials of two circuits; a transformer $T^1$, $T^5$ for each of said respective sources; a primary winding $X^1$, $X^5$ for each of said respective transformers; a leg or pole piece or core element $L^1$, $L^5$ for each of said respective transformers; and a secondary winding $Y^1$, $Y^5$ for each of said respective transformers.

The transformer fluxes are due to the magneto-motive forces of the ampere turns of the primary and secondary windings of the respective transformers.

Another flux is induced by current passing through two other windings $OW^1$, $OW^5$ connected to two sources $I^1$, $I^5$, in this instance derived from the currents of the same or different phases of the circuits from which the potentials above noted are respectively derived. These two other windings are each wound upon two legs $OL^2$, $OL^4$ in such manner that their magneto-motive forces normally oppose one another. The net flux, if other than zero, cooperates with the transformer fluxes. These several fluxes induce electric currents in one or more conductors, for some useful purpose. In the present embodiment of the invention (see Figs. 1 and 2) the conductor is a movable element, to wit, a disc G pivoted as at 10 to one side of the plane of the laminated core C. The disc is driven by the vectorial sum of the forces acting upon it, that is, the resultant force arising from the reaction of the resultant flux and the flux caused by the electric currents induced thereby in the driven element G. The driven element G may simply allow an observer to determine its position and/or direction of movement, as in synchronizers. Or the driven element may deliver mechanical power for power purposes, or run a totalizer or operate a pointer or recording device (stylus or the like) or contacts, or the like.

In the present instance the apparatus is illustrated as a relay, and the disc G is normally stationary. Upon any departure from normal condition, the disc tends to rotate in one direction or the other, retarded if desired by one or more drag magnets DM (Fig. 2) and the torque developed is determined by the magnitude of the abnormality that causes the torque. Such torque may be used for any of the several purposes above named, for which such torque may be suitable.

*Normal condition.*—In tracing the several currents and fluxes during normal condition, assume the sources $E^1$, $E^5$ in phase and sources $I^1$, $I^5$ in phase, and the ampere turns in the two primaries equal, and assume an instant when the right-hand conductor at each source of power is plus, as indicated in Fig. 1. At this time, current in primary $X^1$ flows to the left on the front side of the winding, inducing in secondary $Y^1$ a current flowing to the right on the front side of the latter winding. The latter current flows through a resistance $Q^1$. Assume the current at source $I^1$ flows to the left through the front side of the other winding $OW^1$ on the left leg $OL^2$, and to the right through the front side of said winding $OW^1$ on the right leg $OL^4$. Current in primary $X^5$ flows to the right on the front side of the winding, inducing in secondary $Y^5$ a current flowing to the left on the front side of the latter winding. Assume the current at source $I^5$ to be in phase with the current at source $E^5$. The current at $I^5$ flows to the right through the front side of the other winding $OW^5$ on the left leg $OL^2$, and to the left through the front side of said winding $OW^5$ on the right leg $OL^4$. The proportioning of the windings and other factors is preferably such that this opposite flow of currents in the other windings $OW^1$, $OW^5$ produces normally zero flux in the legs $OL^2$, $OL^4$ in quadrature with the transformer flux. As there is no traveling field acting on the disc, the disc does not rotate.

*Abnormal condition I, caused by relative increase of current at source $I^1$.*—In tracing the several currents and fluxes upon a departure from normal condition, assume the currents at the sources $I^1$, $I^5$ in phase and the current at the source $I^1$ larger than normal with respect to current at source $I^5$. At this time, the directions of the several currents are the same as during normal condition. The fluxes, however, are different. The current in the other winding $OW^1$ is thus greater than the current in other winding $OW^5$. The flux due to the differential action of other windings $OW^1$, $OW^5$ is no longer zero, but has a magnitude determined by the extent of inequality between the ampere turns in the other windings $OW^1$, $OW^5$. That is, the larger the difference between the currents in the other windings, the larger is the other flux; and with the current in winding $OW^1$ the greater, the other flux has one phase relation with the transformer fluxes, while if the current in winding $OW^5$ were the greater, the other flux would have a different phase relation with the transformer fluxes.

(A) Assume the instant when the right-hand conductors at each source of power is plus. The leg $L^1$ at the portion adjacent the disc G is therefore zero. The leg $L^5$ may be disregarded. The leg $L^3$ is of opposite polarity to leg $L^1$, and is also zero. The net flux due to the preponderance of winding $OW^1$ over winding $OW^5$ in this instance lags behind the transformer fluxes. The extent of lag, for the purpose of the analysis hereinafter, may be considered as nominally ninety degrees. The upper legs $OL^2$, $OL^4$ are thus plus and minus, respectively. At this instant, then, the legs $L^1$, $OL^2$, $L^3$, $OL^4$ are respectively zero, plus, zero, minus.

(B) Assume now an instant one-quarter cycle later. The two terminals at each source of power are now of zero potential, producing zero current in each primary $X^1$, $X^5$; there is thus minus polarity at leg $L^1$ and plus at leg $L^3$. Since the other flux lags ninety degrees behind the transformer fluxes, said other flux is now zero at the legs $OL^2$ and $OL^4$. At this instant, then, the legs are respectively minus, zero, plus, zero, which means that the plus polarity has traveled from leg $OL^2$ to leg $L^3$.

(C) Assume now an instant another one-quarter cycle later. The right-hand terminal at each source of power is now minus, and the several currents and fluxes are thus one-half cycle behind their directions and values at the initial instant, indicated in paragraph A above. The legs are thus now respectively zero, minus, zero, plus, which means that the plus polarity has traveled from leg $L^3$ to leg $OL^4$.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The legs are thus now respectively plus, zero, minus, zero, which means that the plus polarity has disappeared from leg $OL^4$ and reappeared at leg $L^1$.

(E) Assume now an instant another one-quarter cycle later, that is, an entire cycle later than the condition in paragraph A. The legs are now of the same polarity as at the instant in paragraph A, namely, respectively zero, plus, zero, minus, which means that the plus polarity has traveled from leg $L^1$ to leg $OL^2$.

Figure 2:
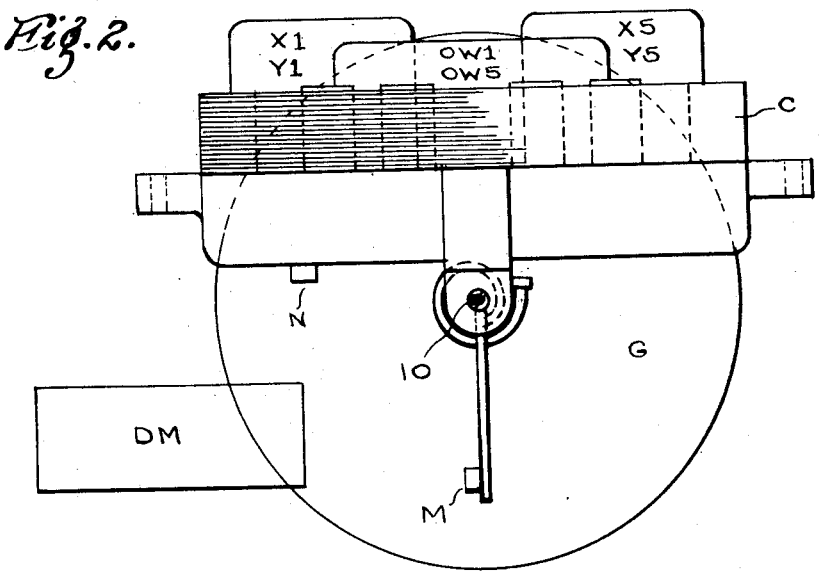
Fig. 2 is a plan of the parts shown in Fig. 1, excluding the connections.

The traveling field thus produced causes electric currents in the disc G, and the reaction between said flux or field and the flux caused by said currents produces torque in the disc, tending to rotate the disc clockwise (Fig. 2).

*Abnormal condition II, caused by relative increase of current at source $I^5$.*—Next may be traced the several currents and fluxes when the departure from normal condition is caused by the current at the source $I^5$ becoming larger than normal with respect to the current at source $I^1$.

(A) Assume first the instant when the right-hand conductor at each source of power is plus. The leg $L^1$ may be disregarded. The leg $L^5$ is zero, so far as the transformer fluxes therein are concerned. The leg $L^3$ is of opposite polarity to leg $L^5$ and is also zero. The net flux to the preponderance of winding $OW^5$ over winding $OW^1$ may be considered as ninety degrees ahead of the transformer fluxes. At the instant in question, the leg $OL^2$ is minus and the leg $OL^4$ is plus. At this instant, then, the legs are respectively minus, zero, plus, zero.

(B) Assume now an instant one-quarter cycle later. The two terminals at each source of power are now of zero potential, producing zero current in each primary $X^1$, $X^5$; there is thus minus polarity at leg $L^5$. Since the other flux leads the transformer fluxes by ninety degrees, said other flux is now zero at legs $OL^2$ and $OL^4$. At this instant, then, the legs are respectively zero, plus, zero, minus, which means that the plus polarity has traveled from leg $OL^4$ to leg $L^3$, or in an opposite direction to its direction of travel during the corresponding quarter-cycle A—B during abnormal condition I.

(C) Assume now an instant another one-quarter cycle later. The left-hand terminal at each source of power is now plus, and the several currents and fluxes are thus one-half cycle behind their directions and values at the initial instant A. The legs are thus now respectively plus, zero, minus, zero, which means that the plus polarity has traveled from leg $L^3$ to leg $OL^2$.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The legs are thus now respectively plus, zero, minus, zero, which means that the plus polarity has disappeared from leg $OL^2$ and has reappeared at leg $L^5$.

(E) Assume now an instant another one-quarter cycle later, that is, an entire cycle later than the condition in paragraph A. The legs are now of the same polarity as at the instant in paragraph A, namely, respectively minus, zero, plus, zero, which means that the plus polarity has traveled from leg $L^5$ to leg $OL^4$.

The disc thus tends to rotate counter-clockwise (Fig. 2).

*Résumé.*—Thus an excess of current at the source of power $I^1$ relative to the current at source $I^5$ (abnormal condition I) causes travel of plus polarity and hence torque in one direction while a relative excess of current at the source of power $I^5$ (abnormal condition II) causes travel of plus polarity and hence torque in the opposite direction. In the latter case, as in the former, the magnitude of said relative excess of current determines the magnitude of the torque, for the reasons above noted.

The apparatus is thus simple in construction, may be made sensitive to small departures from normal condition, and is yet rugged enough to endure severe service conditions.

FIGURE 3.

*Construction.*—In Fig. 3, the relay of Fig. 1 is shown connected to operate in a differential reactive volt-ampere switch-gear, with two polyphase generators $O^1$, $O^5$, connected respectively to circuits $K^1$, $K^5$ leading to a bus B. Relay R has its sources $E^1$, $I^1$ connected to a voltage and a current in quadrature with one another, in circuit $K^1$, and its sources $E^5$, $I^5$, connected to analogous factors of circuit $K^5$.

*Normal condition.*—When the load in the circuits is properly apportioned the ampere turns in the two other windings $OW^1$, $OW^5$ of the relay neutralize one another, and the movable contact M remains in the open-circuit or mid-position shown in Fig. 3; held there, preferably by oppositely acting retracting springs 17.

*Abnormal condition I.*—When circuit $K^1$ and hence generator $O^1$ receives more than its share of the reactive load, the preponderance of watts at the left causes the disc to rotate clockwise, closing contacts M—$N^1$. This energizes contactor solenoid $CS^1$, which thereupon rises and closes the circuits to the reactive-load-decreasing field $DF^1$ of the governor motor $GM^1$ and to the reactive-load-increasing field $IF^5$ of the governor motor $GM^5$. The motors adjust governors $GV^1$, $GV^5$ for the turbines $TB^1$, $TB^5$ or other suitable apparatus that drive the respective generators. The motors run until the proper apportioning of the reactive load is restored, whereupon the relay disc returns to normal position and the motors stop.

*Abnormal condition II.*—When circuit $K^5$ and hence generator $O^5$ receives more than its share of the reactive load, the reverse action occurs. That is, the relay contacts M—$N^5$ close and cause contactor solenoid $CS^5$ to energize the reactive-load-increasing field $IF^1$ of motor $GM^1$ and the reactive-load-decreasing field $RF^5$ of motor $GM^5$, whereupon the reactive load is reapportioned to its normal relative values.

IN GENERAL.

If during normal condition, the sources of power of the relay have any acute-angle phase relation, and equal or unequal power factors, the disc is stationary while the watts on the two sides are equal; and during abnormal conditions, if the two sources of power be out of phase with one another, and/or of unequal power factor the directions of rotation will be unchanged.

The above also applies to embodiments of the invention in apparatus other than relays, that is, any acute-angle phase relation between the currents at the sources does not cause the resultant field to travel when the watts on the two sides are equal, but does cause it to travel in one direction or the other when such watts are unequal. During the former condition there is a flux through the poles $OL^2$, $OL^4$, but the phase relation of the flux with respect to the transformer flux is such that no traveling field is produced. In the system shown in Fig. 3, two relays may be provided, each with one fixed contact, in which case the circuit conditions will be modified accordingly.

From the above it will be seen that the several objects of the invention are attained and other advantageous results achieved.

As many modifications of the embodiment above illustrated might be made without departing from the spirit or scope of the present invention, it is intended that the above description and accompanying drawings shall be interpreted as illustrative and not in a limiting sense.

I claim:

1. In an electrical system, a bus, two power circuits feeding said bus, generators energizing said power circuits and prime movers driving the generators, said prime movers including governors, motored means effecting control of said governors, and circuits controlling the motored means, contactors in said circuits for controlling the effect thereof on the motored means, means controlling the action of the contactors, a differential reactive load switch-gear comprising a relay having connections to two factors, to wit, voltage and current, of each of said two power circuits, the connections to one factor being in quadrature with the other factor in the power circuit, the voltage and current from one circuit producing fluxes in quadrature, the voltage and current from the other circuit producing fluxes in quadrature with one another and having operative components coacting with the respective fluxes due to the first circuit and a member movable to vary the action of the means controlling the contactor action, whereby the relative conditions of said power circuits are varied through control of said prime movers.

2. In an electrical system, a plurality of power feeder circuits, generators energizing said power circuits, prime movers driving the generators including governing means, means effecting control of the governors including control circuits, a differential reactive load switch-gear comprising a relay having connections to two factors, to wit, voltage and current, of each of said power circuits, the connections to one factor being in quadrature with the other factor in the power circuit, the voltage and current from one circuit producing fluxes in quadrature, the voltage and current from another circuit producing fluxes in quadrature with one another and having operative components coacting with the respective fluxes due to the first circuit, and a member movable to vary the action of said control circuits for the governing means, whereby the relative conditions of said power circuits are varied through control of said prime movers.

3. In an electrical system, a plurality of power circuits, means energizing said power circuits having governing means, means for effecting control of the governing means whereby the energization of the power circuits is affected, a differential reactive load switch-gear comprising a relay having connections to two factors, to wit, voltage and current, of each of said power circuits, the connections to one factor being in quadrature with the other factor in the power circuit, the voltage and current from one circuit producing fluxes in quadrature, the voltage and current from the other circuit producing fluxes in quadrature with one another and having operative components coacting with the respective fluxes due to the first circuit, and a member movable to control the means for effecting governor control by movement in different directions, the net fluxes producing a traveling field tending to cause movement of said member in one direction or the other, depending on the instantaneous apportionment of reactive load between the circuits.

In testimony whereof, I have signed my name to this specification this 23rd day of July, 1923.

ROLLIN N. CONWELL.